US006628404B1

(12) United States Patent
Kelley et al.

(10) Patent No.: US 6,628,404 B1
(45) Date of Patent: Sep. 30, 2003

(54) ACOUSTIC SENSOR FOR REAL-TIME CONTROL FOR THE INDUCTIVE HEATING PROCESS

(75) Inventors: John Bruce Kelley, Albuquerque, NM (US); Wei-Yang Lu, Pleasanton, CA (US); Fred J. Zutavern, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 343 days.

(21) Appl. No.: 09/718,293

(22) Filed: Nov. 21, 2000

(51) Int. Cl.⁷ .......... G01B 9/02

(52) U.S. Cl. .......... 356/502

(58) Field of Search .......... 356/502, 498, 356/482, 432

(56) References Cited

U.S. PATENT DOCUMENTS

| | | | | |
|---|---|---|---|---|
| 5,226,730 A | | 7/1993 | Berthold | 374/119 |
| 5,286,313 A | | 2/1994 | Schultz et al. | 148/508 |
| 5,410,405 A | * | 4/1995 | Schultz et al. | 356/432 |
| 5,648,611 A | | 7/1997 | Singh et al. | 73/598 |
| 5,804,727 A | | 9/1998 | Lu et al. | 73/597 |
| 6,057,927 A | | 5/2000 | Levesque et al. | 356/432 T |
| 6,078,397 A | * | 6/2000 | Monchalin et al. | 356/502 |

OTHER PUBLICATIONS

Wei–yang Lu, Jay J. Dike, Lawrence W. Peng and James C. F. Wang, *Stress Evaluation and Model Validation Using Laser Ultrasonics*, Feb. 1999, SAND99–8232, Sandia National Laboratories, Albuquerque, New Mexico and Livermore, California.

* cited by examiner

*Primary Examiner*—Samuel Turner
*Assistant Examiner*—Michael A. Lyons
(74) *Attorney, Agent, or Firm*—Robert D. Watson

(57) ABSTRACT

Disclosed is a system and method for providing closed-loop control of the heating of a workpiece by an induction heating machine, including generating an acoustic wave in the workpiece with a pulsed laser; optically measuring displacements of the surface of the workpiece in response to the acoustic wave; calculating a sub-surface material property by analyzing the measured surface displacements; creating an error signal by comparing an attribute of the calculated sub-surface material properties with a desired attribute; and reducing the error signal below an acceptable limit by adjusting, in real-time, as often as necessary, the operation of the inductive heating machine.

19 Claims, 9 Drawing Sheets

ACOUSTIC SENSOR FOR REAL-TIME CONTROL FOR THE INDUCTIVE HEATING PROCESS

CROSS-REFERENCE TO RELATED APPLICATIONS

This application is related to U.S. Pat. No. 6,455,825, "Use of Miniature Magnetic Sensors for Real-Time Control of the Induction Heating Process," by A. E. Bentley, et al., issued Sept. 24, 2002.

FEDERALLY SPONSORED RESEARCH

The United States Government has rights in this invention pursuant to Department of Energy Contract No. DE-AC04-94AL85000 with Sandia Corporation.

BACKGROUND OF THE INVENTION

This invention relates generally to the field of heat treatment of metals, and more specifically to a method and system of providing real-time, closed-loop control of an induction heating machine by using an acoustic sensor to measure, in real time, changes in characteristic material properties of a workpiece during the process of induction heating. The method includes the steps of generating an acoustic (e.g. ultrasonic) wave in the workpiece with a pulsed laser; optically measuring displacements of the surface of the workpiece in response to the acoustic wave; and calculating the sub-surface material properties by analyzing the measured displacements.

Induction heating is a well-known process for efficiently applying energy directly to metals and other conductive materials for heat treating, melting, welding, brazing, tempering, normalizing, aging, or pre-heating prior to hot working. Induction heating can also be used in non-metal applications, including adhesive bonding, graphitizing carbon, drying, curing, and superheating glass. Some parts, such as those in turbine engines, have extremely different material requirements in different regions of the part. Heat processing of such parts requires non-uniform thermal distribution that must be precisely controlled. In the induction heating process, alternating electric current is passed through an induction heating coil that is positioned closely to a workpiece. Where the lines of magnetic flux produced by the induction heating coil enter the workpiece, the alternating magnetic fields induce an alternating electric potential (e.g. voltage) in the workpiece. The alternating electric potential drives eddy currents in a thin surface layer. These eddy currents dissipate energy within the surface layer by resistive Joule heating losses. The depth of resistive heating (e.g. skin depth) is inversely proportional to the square root of the product of three parameters: applied induction frequency, magnetic permeability, and electrical conductivity. The resultant steep temperature rise in the resistively heated surface layer is related to the specific heat, density, thermal conductivity, power level, and duration of heating. Magnetic coupling of the induction heating coil to the workpiece depends strongly on the geometrical arrangement, among other properties.

A common use of induction heating is case hardening of medium-carbon steel parts, such as gears, axles, and drive-shafts. Many industrial applications require a steel part having a hardened outer surface (e.g. "case") and an interior region of higher toughness to provide improved strength, wear resistance, fatigue life, and toughness. Other applications include induction hardening of crankshafts, valve seats, railroad rails, rolling-mill rolls, and hand tools. Induction heating rapidly heats the outer surface layer of the steel workpiece in a short period of time (e.g. 5 seconds). This produces a very large temperature gradient through the depth, which can be as large as 100 C/mm. Above a critical transition temperature (about 760 C for 1050M steel with 0.45% C) the initial ferrite-pearlite microstructure (BCC) transforms into the austenite phase (FCC). The depth of the "hot boundary layer" is commonly 1–5 mm, depending on the heating time and material properties, for induction heated steel shafts.

Upon continued heating of the part, the transformed austenite layer thickens and extends deeper from the surface. Optimum peak surface temperatures can be 870–925 C, depending on the carbon concentration, and the desired depth of hardening. For some applications, the peak surface temperature can be as high as 1200 C. Final hardening of the outer layer occurs when the heating power is shut off and the part is quenched (e.g. rapidly cooled from the outside to less than 200–400 C in 10–20 seconds). This converts the austenitic layer into a hard, metastable martensitic phase with a Rockwell hardness of $R_c$=50–60. An optional tempering step can follow the quench cycle, which can further improve the metallurgical properties.

Induction hardened steel parts are designed to have a case hardened layer with a specific desired depth. For example, a 25 mm diameter 1050M steel automobile axle may be designed with a hardened layer from 4–5 mm thick, as defined by a Rockwell hardness of at least $R_c$=50. Should the layer be too thin, the axle would wear too quickly or have insufficient strength; should the layer be too thick, the axle would be too brittle. During mass production, the measured case depth should be repeatable to within +/−0.1 mm. This requires close control of the induction heating process, as well as tight control of material properties, chemistry, workpiece alignment, etc.

Closed-loop control of the induction heating and hardening processes has been an elusive goal of the industry for many years. Existing induction hardening equipment is typically operated with open-loop process controllers, wherein an operator manually selects power and time (e.g. heating duration). Production users of this equipment monitor the process by destructively sectioning finished parts and inspecting the results; i.e., a finished part is cut apart and the case depth is directly measured radially across the cross-section by using a Rockwell hardness indentor, metallographic inspection, or chemical analysis of the carbon concentration profile. Process development for new parts is accomplished by time-consuming and expensive trial-and-error; for a given coil and part design, heating and quenching parameters are varied until destructive analysis reveals that the desired hardness profile is being produced.

These parameters are then utilized in the production run and the hardened parts are sampled and analyzed at regular intervals for quality control and assurance. If the tested part is bad, the production run from the previously tested good part is sampled to determine where the process failed. Production equipment may be taken out of service until subsequent parts test satisfactory. Since each test can take a minimum of several minutes by a trained technician, this process is quite inefficient for mass production. Unfortunately, small variations in the steel's chemistry and microstructure can produce unacceptably large variations in the measured case depths, even for nominally acceptable material specifications. The cause of these variations is not well understood.

Other sources of variability include improper part positioning (e.g. misalignment relative to the heating coil), defects in the part (e.g. cracks), and damaged or aged heating coils. Low hardness values measured on a finished part may be caused by: surface decarburization; lower carbon content than specified; inadequate austenitizing temperature; prior structure; retained austenite (mostly in high-carbon steels); and unsatisfactory quenching.

What is needed is a real-time, non-destructive, non-contact diagnostic technique that can respond quickly to the temperature changes and phase transformations in the workpiece during the induction heating process. The diagnostic should be small enough to provide sufficient spatial resolution, and robust enough to withstand the hostile environment (e.g. high temperatures, high magnetic fields, rotating parts, and large volumes of quenching fluids). Use of an active feedback of process information measured directly from the part, coupled with closed-loop control of the heating process, would greatly improve the efficiency of induction hardening systems, while increasing accuracy and reducing part rework.

Direct measurement of the workpiece's surface temperature during induction heating could provide a useful signal for closed-loop feedback control. However, use of contact thermocouples is impractical for mass production, especially since cylindrical parts are often rotated at significant rpm's to create uniform heating profiles. Non-contact optical pyrometry could be used, however the accuracy is affected by surface conditions (e.g. emissivity) and the operating environment (e.g. smoke, dust, vapors). Coating of the pyrometer's window by the quenching fluid can also degrade accuracy. Historically, pyrometers have not had a sufficiently fast response time to monitor the rapid changes in surface temperature during induction heating. Neither pyrometry, nor surface-attached thermocouples, can directly measure the internal temperatures within a workpiece.

Indirect measurement of the workpiece's temperature, and/or temperature profile through the depth, can be inferred by measuring corresponding changes in the elastic, metallurgical, electrical, and magnetic properties of the workpiece as it heats up during induction heating. For example, the resistivity of medium-carbon steels can increase as much as 800% as the temperature increases from 20 C to 900 C.

The average electrical resistance of the workpiece (e.g. averaged over the cross-sectional area) can be measured indirectly by monitoring the voltage, current, and phase of the induction heating coil. This approach is described in U.S. Pat. No. 5,630,957 (commonly assigned to Sandia Corporation), which is herein incorporated by reference. In this patent, Adkins et al. teach a method of closed-loop control of an induction hardening machine that uses a trained neural network processor, combined with real-time measurement of the voltage, current, and phase in the induction coil, as measured by a Rogowski coil surrounding a current lead. The depth of hardening is controlled, in part, by computing the energy absorbed by the workpiece, and the changes in the average resistance of the coil plus the workpiece during the heating duration. However, this method does not provide any direct information regarding the temperature profile through the depth, or local information at a specific point on the workpiece.

Acoustic sensors can provide local, non-destructive, non-contact diagnostic information about variations in the material properties throughout the depth. Acoustic sensors rely on the fact that the speed of sound for longitudinal elastic (e.g. acoustic) waves is proportional to the square root of the ratio of the elastic modulus divided by the density. For other wave modes, such as Rayleigh surface waves, Lamb waves, etc., the relationship between wave speed and the physical properties have more complicated equations. Any variation in these elastic properties and microstructure, or the presence of internal boundaries, voids, sharp gradients, etc. manifest themselves in elastic wave time-of-flight (TOF) variations, internal reflections, and acoustic interference patterns that can be measured and/or imaged by optical methods looking at the surface of the part.

Acoustic sensors have been used to indirectly measure the depth of case hardening on finished parts. U.S. Pat. No. 5,648,611 to Singh et al. discloses a method of measuring the case depth by (1) launching an acoustic wave along the surface of the specimen such that the wave passes through the case (e.g. hardened layer), (2) determining the velocity of the wave by time-of-flight (TOF) measurement; and (3) comparing the measured velocity with a correlation previously established between wave velocity and case depth for the same wave frequency. This patent teaches the use of one or more electromagnetic acoustic transducers (EMAT's) to generate and detect the ultrasonic pulses. A serious problem with using EMAT's for real-time control of the induction heating process is the requirement for EMAT's to be in close proximity (e.g. <1 mm) to the specimen's surface. Typically, EMAT's do not require coupling fluids, but piezoelectric transducers do. For high temperature application, water cooling is necessary to keep the magnet well below its Curie transition temperature if a permanent magnet is used. For inductively heated parts, where the surface temperatures can exceed 900 C, the part is often rotated and subjected to large volumes of quenching fluids. In this case, the use of EMAT's present serious difficulties in their practical application because of the requirement that they be located in close proximity to the heated surface.

A preferred alternative to using EMAT's for process control of inductive heating is using laser ultrasonic (LU) sensors to generate and detect acoustic waves. Laser ultrasonic sensors are non-contacting, and can be placed at a much larger distance from the specimen's surface than EMAT's. Fiber optic cables can be used to carry the laser beams. Laser ultrasonic techniques have been used to measure the wall thickness of tubes during production. (see U.S. Pat. No. 6,078,397 to Monchalin, et al.). Another common use of laser ultrasonic sensors is measurement of the bulk temperature of a silicon semiconductor wafer during thermal processing (see U.S. Pat. No. 5,724,138 to Reich and Kotidis).

Acoustic sensors have been used to measure anisotropic characteristics of properties, especially those resulting metallurgical treatments such as rolling, forming, extruding, drawings, and forging. Those treatments create anisotropy in the grain size, texture, and crystal orientation, which can be detected with laser ultrasonic techniques (see U.S. Pat. No. 5,804,727 to Min and Lu, which is herein incorporated by reference).

Laser ultrasonic methods have been demonstrated in the laboratory to measure the elastic modulii of various titanium-hydrogen alloys over the range of 20–1100 C. See O. N. Senkov, M. DuBois, and J. J. Jonas. "Elastic Modulii of Titanium-Hydrogen Alloys in the Temperature Range of 20 to 100 C," Metallurgical and Materials Transactions A, 27A, Dec., 1996, pp 3963–3969. In that work, acoustic waves were generated using 6 ns long laser pulses, and then detected with a confocal Fabry-Perot laser interferometer to sense the variation in elastic modulii between bars having different, but uniform, hydrogen concentration. In those measurements, the temperature of the bar was uniform and homogeneous.

Laser ultrasonic techniques have been disclosed that can provide real-time industrial process control (see U.S. Pat. No. 5,286,313 to Schultz, et al.). However, Schultz does not discuss the use of laser ultrasonic techniques for real-time control of the induction heating process. As discussed earlier, induction heating typically creates very steep temperature gradients (e.g. 100 C/mm) and metallurgical phase changes in a thin, hot boundary layer (1–5 mm), especially during the induction hardening process. This highly complex, non-linear temperature profile creates unique problems with the interpretation and understanding of data generated by laser ultrasonic sensors.

The very steep temperature profile created by induction heating is to be contrasted with conventional furnace heating, such as used for annealing or heat treating, where the workpiece temperature is essentially uniform and homogenous during heating. In this case of uniform temperature throughout the body, simple corrections can be used for the temperature-dependent elastic wave velocity. Such a simple approach is not suitable for monitoring the steep temperature gradients produced during induction heating, especially for induction hardening processes.

Against this background, the present invention was developed.

DETAILED DESCRIPTION OF THE INVENTION

Surface wave techniques are used to obtain the characteristics of the hot boundary layer during induction heating. It is well-established that the depth of penetration of a Rayleigh surface wave is related to its wavelength. The propagation of surface waves is, hence, influenced by any gradient in material properties (e.g. temperature) through the depth of penetration. Acoustic techniques based on this principle are used in the present invention. By using waves of various wavelengths, the through-thickness properties of the solid can be obtained. A surface wave of very short wavelength provides the information about the surface layer, while a surface wave of longer wavelength carries the information of a thicker layer. A wide band acoustic pulse, composed of many wavelengths, is broadened as it propagates due to its range of wavelengths and corresponding velocities. This dispersion broadening is a measure of the temperature gradient at the surface. Alternatively, if a fixed wavelength is used, then any time-dependent changes in material properties within that surface layer (e.g. the hot layer) can be detected and measured by continuously monitoring the changes in acoustic wave propagation characteristics. Since the material properties (e.g. elastic modulus) are well-known functions of temperature, then the temperature profile, and/or hot layer thickness, can be obtained by using these techniques, since the acoustic wave's velocity depends on elastic modulus, which, in turn, affects the time-of-flight (TOF).

Short wavelength ultrasonic pulses imparted at the surface of part, for example, a cylindrical bar, can be generated with 30 ps to 10 ns long laser pulses. This technique, called Laser Ultrasonics (LU), can be characterized by the simultaneous generation of multiple wave types and modes (e.g. surface, Rayleigh, Lamb, horizontally polarized shear, etc.), the specifics of which are dependent upon the properties (duration, temporal and spatial shape, power) of the generation laser pulse(s) and the boundary conditions of the specimen. The laser ultrasonic method is especially useful for harsh environments because it is a non-contact technique. For a laser pulse of 10 ns, the waveform generated on aluminum, for example, at room temperature has the wavelength of 1–2 mm. The wavelength may be modified by parameters such as laser pulse width.

The simplest way to sense a change in the sound velocity as the bar is heated is to detect the surface vibrations when the pulse reaches the far side of the bar. Variations in the measured time-of-flight (TOF) as the bar heats up provide the integral of the velocity variation over the diameter of the bar caused by the temperature dependent elastic modulus and density. This information can be used to obtain a real-time measurement of the hot layer "thickness" as the bar is being heated and cooled, which is useful for process and quality control.

Figure 1:
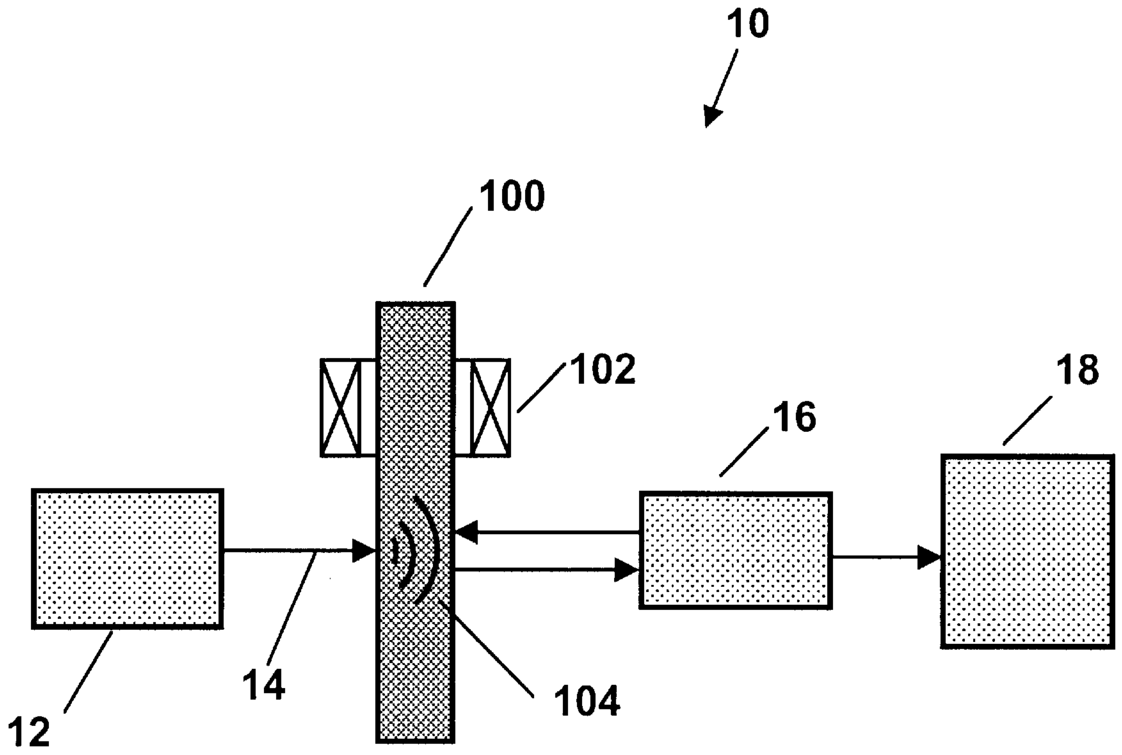
FIG. 1 illustrates a schematic system of an acoustic sensor system for performing process control of an induction heated part using laser ultrasound techniques, according to the present invention.

FIG. 1 illustrates a schematic system of an acoustic sensor system 10 for performing process control of an induction heated part using laser ultrasound techniques, according to the present invention. Workpiece 100 is at least partially surrounded by induction heating coil 102. Laser 12 applies a pulsed beam of energy to the surface of workpiece 100 while workpiece 100 is being heated by induction heating coil 102. The intense, localized heating of the surface of workpiece 100 by laser beam 14 creates an ultrasonic acoustic elastic wave 104 that travels throughout workpiece 100. Acoustic wave 104 creates displacements in the surface of workpiece 100, which can be detected by an optical interferometer 16. In the configuration shown in FIG. 1, optical interferometer 16 measures deflections of the backside of workpiece 100. Those skilled in the art will recognize that many different techniques useful for detection of surface or particle motion due to the passing of an ultrasonic wave may be used, e.g., Doppler velocimeter, phase sensitive detectors, Michelson interferometer, Mach-Zender interferometer, photorefractive interferometer, photo-emf interferometer, etc. A confocal Fabry-Perot interferometer is preferred as a means of detection due to its ability to handle optically rough surfaces (e.g. unpolished surfaces), has a large light gathering capacity, and because it is insensitive to speckles. The surface displacements caused by the elastic waves are detected by the laser interferometer, which outputs a signal representative of the amplitude of surface displacements as a function of time. The time signal can comprise hundreds or vibrations or echoes. The detection system is not limited to out-of-plane disturbances caused by the passage of an ultrasonic wave; in-plane particle motion detectors are equally useful. Furthermore, if two independent detectors are used, the need for a highly stable timing mechanism to trigger data acquisition is not required.

The example shown in FIG. 1 of the invention also includes a processor 18 for processing, in near real-time, signals from interferometer 16 thereby providing physical characteristics of the sample. A plurality of signals can be collected for a plurality of orientations and locations within the workpiece 100. The collection of a plurality of signals can typically be accomplished by rotating or translating the position of the interferometer 16 relative to the workpiece 100. Alternatively, multiple sources and/or detectors can be used. Misalignment of the laser beams can occur if the local normal is not perpendicular to the orientation of the surface and can result in erroneous results. However, numerical correction of the data is possible in this case. Those skilled in the art will appreciate that several other methods of correction are available, e.g., using geometrical relations to correct for this misalignment, assuming the surface normal is known, or taking advantage of known symmetries in the measurement.

Processor 18 can be used to process the signal from interferometer 16 and provide measures of selected physical characteristics of the sample including temperature, temperature-gradient, texture, degree of anisotropy, tensile strength, grain size and orientation, ductility and stress state. In particular, time-of-flight (TOF) information is first extracted from interferometer 16 in processor 18 by extracting a waveform signal within a specified time window. The time window represents an expected time of arrival for a given mode or type of ultrasonic energy, thus not only reducing the time required to process the data from interferometer 16, but also only extracting that data which is representative of a given process within the sample. Changes in the temperature of workpiece 100 during heating by induction coil 102 will be detected in real-time, non-destructively, by acoustic sensor system 10 as changes in the time-of-flight of ultrasonic waves passing through the workpiece's thickness of workpiece 100 and detected on the backside by interferometer 16 because of the temperature-dependence of the elastic wave velocity (via changes in elastic modulus and density with temperature) on temperature.

By use of dispersion curves relevant to the material composition of the sample of interest and boundary conditions for the sample (width, thickness, length, known velocity of propagation for various modes and types of ultrasonic wave propagation) time windows for different modes and types of ultrasonic waves can be determined. A digital gate is used to process a portion of the signal where a particular wave is expected to arrive, given the velocity (known) of the wave and the separation distance between the excitation and detection lasers. The foregoing represents a method to extract velocity information about specific wave types and modes from a complicated signal. Those skilled in the art will recognize that these velocities can be used to determine physical properties such as, but not limited to, density, temperature, viscosity, texture, stress, strain, tensile strength, elastic constants, grain size and orientation, and ductility.

Figure 2:
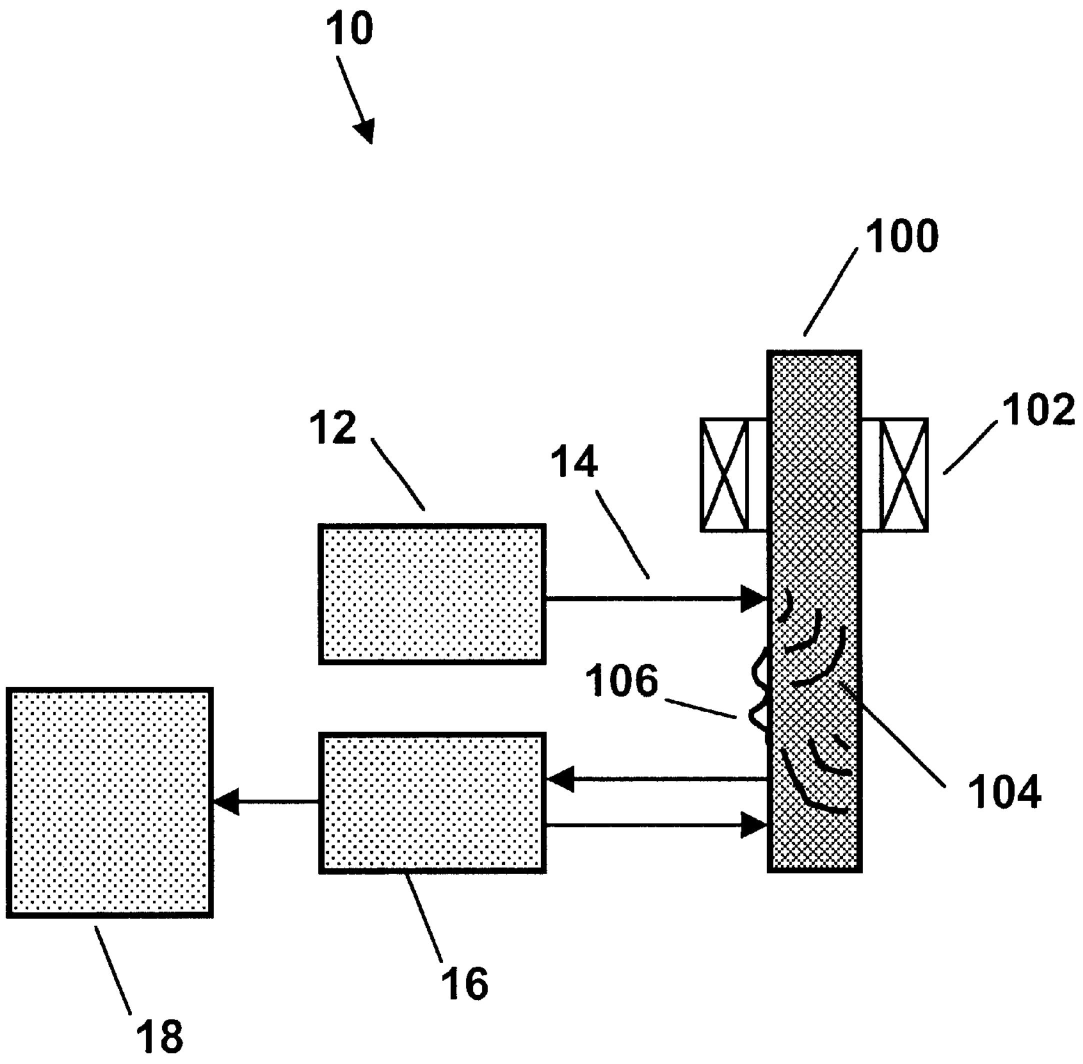
FIG. 2 illustrates a schematic view of a second example of an acoustic sensor system, according to the present invention.

FIG. 2 illustrates a schematic view of a second example of an acoustic sensor system 10, according to the present invention. In this example, laser beam 14 generates acoustic ultrasonic elastic waves 104 and 106, which travel both in the bulk (104) and along the surface (106) of workpiece 100. Interferometer 16 is located on the same side as where laser beam 14 illuminates workpiece 100. Interferometer 16 can detect surface displacements caused by both surface waves 106, and by bulk waves 104 that have reflected inside of workpiece from internal surfaces. The change in signals detected by interferometer 16 are representative of both the bulk (e.g. average) temperature of workpiece 100, and the gradient in temperature versus depth, as workpiece 100 is heated by induction heating coil 102 (and subsequently, quenched).

Figure 3:
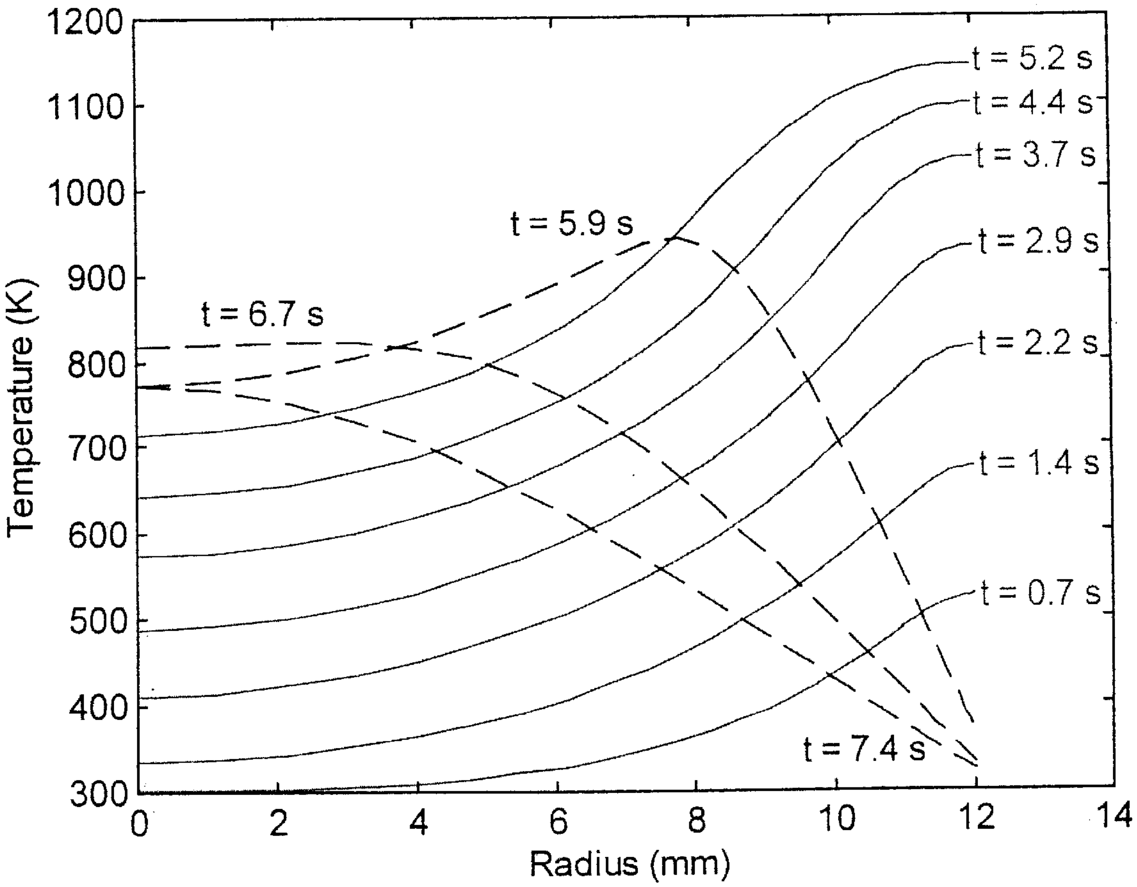
FIG. 3 shows predicted temperature contours in a 25.4 mm long, 12 mm radius cylinder of 1050M steel that is inductively heated in a 25.4 mm long, 25.4 mm diameter induction coil. Heating lasts for 5.2 seconds, followed by a spray quench.
Figure 4:
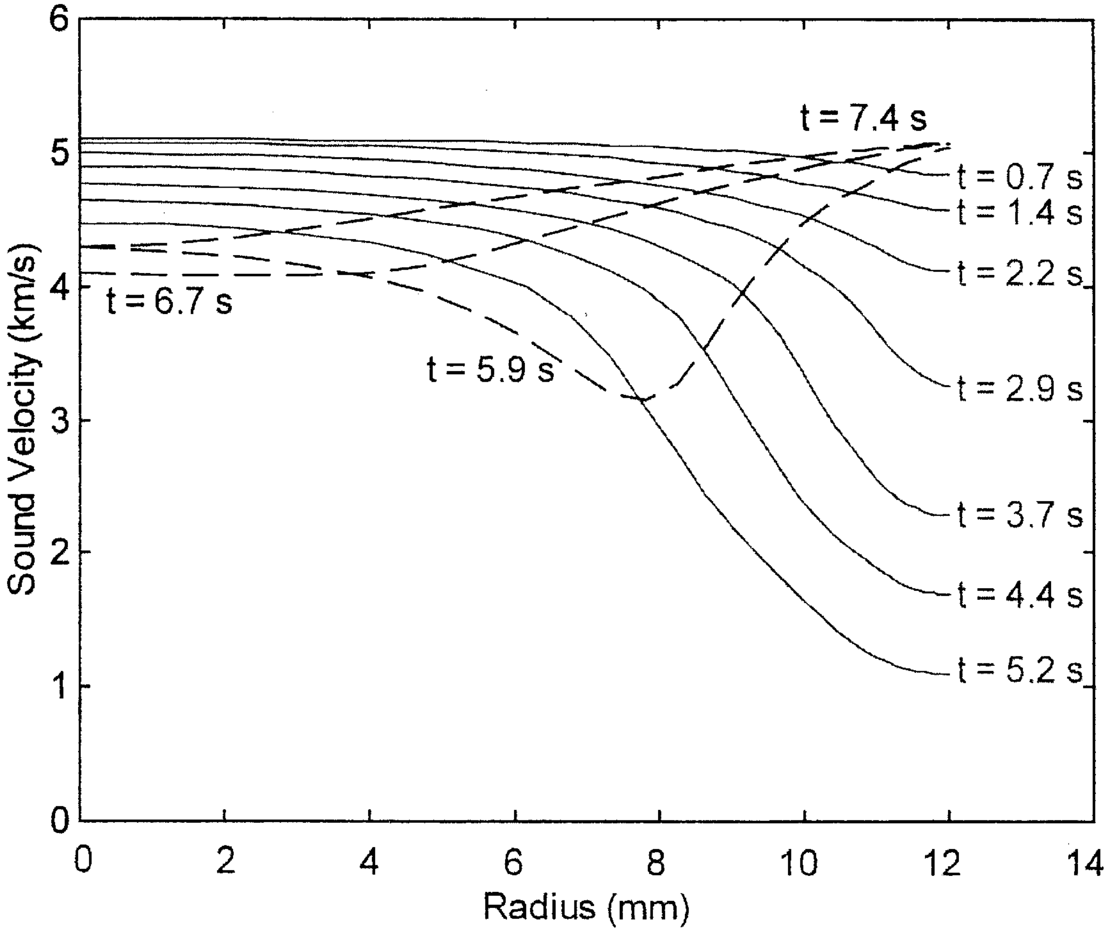
FIG. 4 shows sound velocity contours are shown for the same process described in FIG. 3. The large variation in sound velocity is caused by the large change in the modulus of elasticity at high temperatures.

A related technique involves looking for the reflections of the acoustic pulse off the hot layer "boundary". FIG. 3 shows the predicted temperature profile for a cylinder of 1050M steel which is inductively heated for 5.2 s and quenched for 2.2 s immediately after heating. FIG. 4 shows the speed of sound contours for the same sample during inductive heating. This figure was produced from FIG. 3 using the modulus of elasticity (E) as a function of temperature. FIG. 4 shows such a large variation in sound velocity, that a substantial fraction of the wave will be reflected back to the surface. A velocity-sensitive interferometric technique with optical heterodyning or photo-thermal reflectance spectroscopy can detect the high frequency motion of the surface on top of low frequency motion of the sample, which sometimes is rotated inside the inductive heating coil. The reflected pulses can produce acoustic interference patterns (not to be confused with the optical interference used to detect motion of the sample surface) and can produce standing waves or other interference images at the surface, which change as the hot-layer thickness increases.

The heating process could be adjusted, in real-time, after the desired hot-layer thickness has been reached (and detected by the acoustic sensor) by adjusting the power level of the induction heating coil, or by adjusting the heating duration (e.g. stop time), so that the desired depth of case hardening is precisely achieved. Because laser ultrasonic sensors can measure the hot-layer thickness, the method and system is well suited to provide critical process information useful for actively controlling the induction heating process. This applies not only for induction hardening, but also for high temperature annealing or normalizing of steel and cast iron parts, using induction heating or other heating methods (e.g. furnace, infrared, e-beam, plasma heating, etc). Likewise, similar information could be obtained during cooling, e.g. during rapid quenching.

Figure 5:
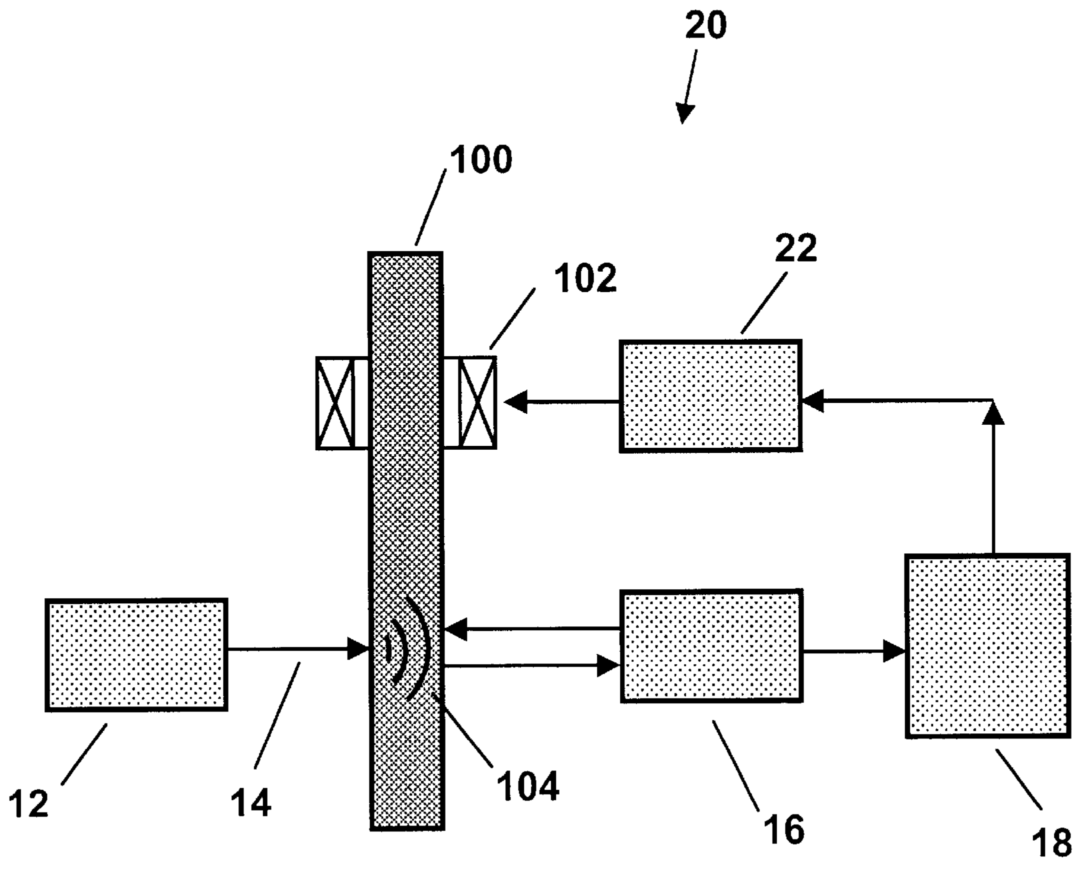
FIG. 5 illustrates a schematic system of a first example of an acoustic sensor system for providing real-time control of the induction heating process, according to the present invention.

FIG. 5 illustrates a schematic system of a first example of an acoustic sensor system 20 for providing real-time control of the induction heating process, according to the present invention. FIG. 5 is similar to the first example of an acoustic sensor system shown in FIG. 1. However, processor 18 provides a feedback control signal to the induction coil control unit 22, which regulates the heating power and duration of induction coil 102. The feedback control signal is derived from interferometric measurements of workpiece 100, during induction heating, in response to laser pulse 14. Measurements of the surface vibrations of workpiece 100 by interferometer 16 provide information, in real-time, on changes in material properties of workpiece, during induction heating, such as temperature, depth of heated layer, microstructural phase, etc.

Processor 18, or analog electronics circuits, can compare one or more calculated attributes of the measured acoustic sensor signals to one or more desired attributes to create an error signal. For example, the error signal can be the difference in time between the measured Curie temperature point, $t_{curie}$, and the desired time when the Curie point should have been reached. More generally, the difference in time can be the difference between any required and desired time to reach a reference temperature. In particular, the reference temperature depends on the type of alloy, and the desired hardness, among other factors. Consider the well-known phase diagram for plain carbon steel. Hardening will occur when the material has been heated above the $A_{c3}$ line and then quenched rapidly. The reference temperature in this case will be close to $A_{c3}$, which depends on the concentration of carbon in the alloy that is being hardened.

The difference in time can be used to create a feedback control signal that feeds back to the induction heating power supply 22. The feedback control signal can be used to adjust the power level of the induction heating power supply 22; or the shut-off time, $t_{off}$, of the current used to drive the induction heating coil 10; or the rate at which the part is being scanned through the coil. The control signal can include a proportional adjustment in the operating parameter (e.g. power level or shut-off time). For example, if the measured Curie temperature point, $t_{curie}$, occurred at a time 10% longer than the desired time, then the power level or shut-off time could be increased by 10% to correct for the delayed Curie point response. Alternatively, processor 18 can utilize a more sophisticated algorithm for determining the correct amount of adjustment, which can be based on complex models for the workpiece's coupled thermal and electromagnetic behavior. Alternatively, the algorithm used by processor 18 can be a neural network program that has been previously trained with data taken from previous heating runs (as described by Adkins et al in U.S. Pat. No. 5,630,957, which is herein incorporated by reference). The goal of making adjustments to power supply 22 is to reduce the magnitude of the error signal below a predetermined acceptable limit.

The feedback control signal from processor 18 can also be used to adjust the relative position of workpiece 100 with respect to heating coil 102. This could be used for a workpiece that is being scanned (not shown) through a fixed heating coil 102.

The steps of measuring the sensors response, creating an error signal, and reducing the error signal by adjusting the machine's operation can be repeated as many times as needed during the induction heating period, in order to achieve the required parameters.

When the methods and systems described above are applied to induction hardening machines, the error signal provides a useful feedback control to adjust, in real-time, the depth of case hardening, towards the desired value.

Figure 6:
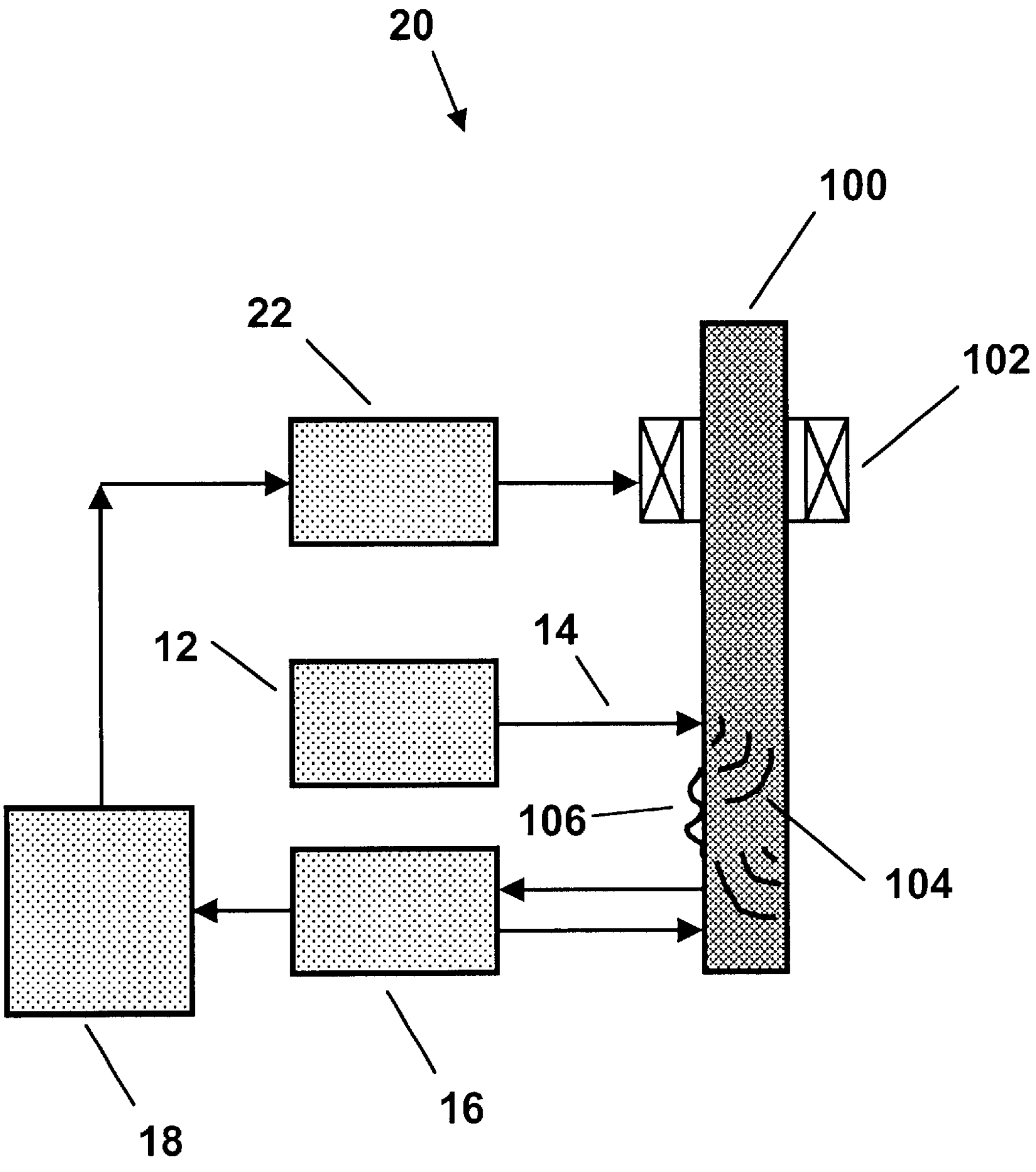
FIG. 6 illustrates a schematic system of a second example of an acoustic sensor system for providing real-time control of the induction heating process, according to the present invention.

FIG. 6 illustrates a schematic system of a second example of an acoustic sensor system 20 for providing real-time control of the induction heating process, according to the present invention. FIG. 6 is similar to FIG. 5, except that interferometer 16 detects surface vibrations from the frontside of workpiece 100 (as shown in FIG. 2).

Figure 7:
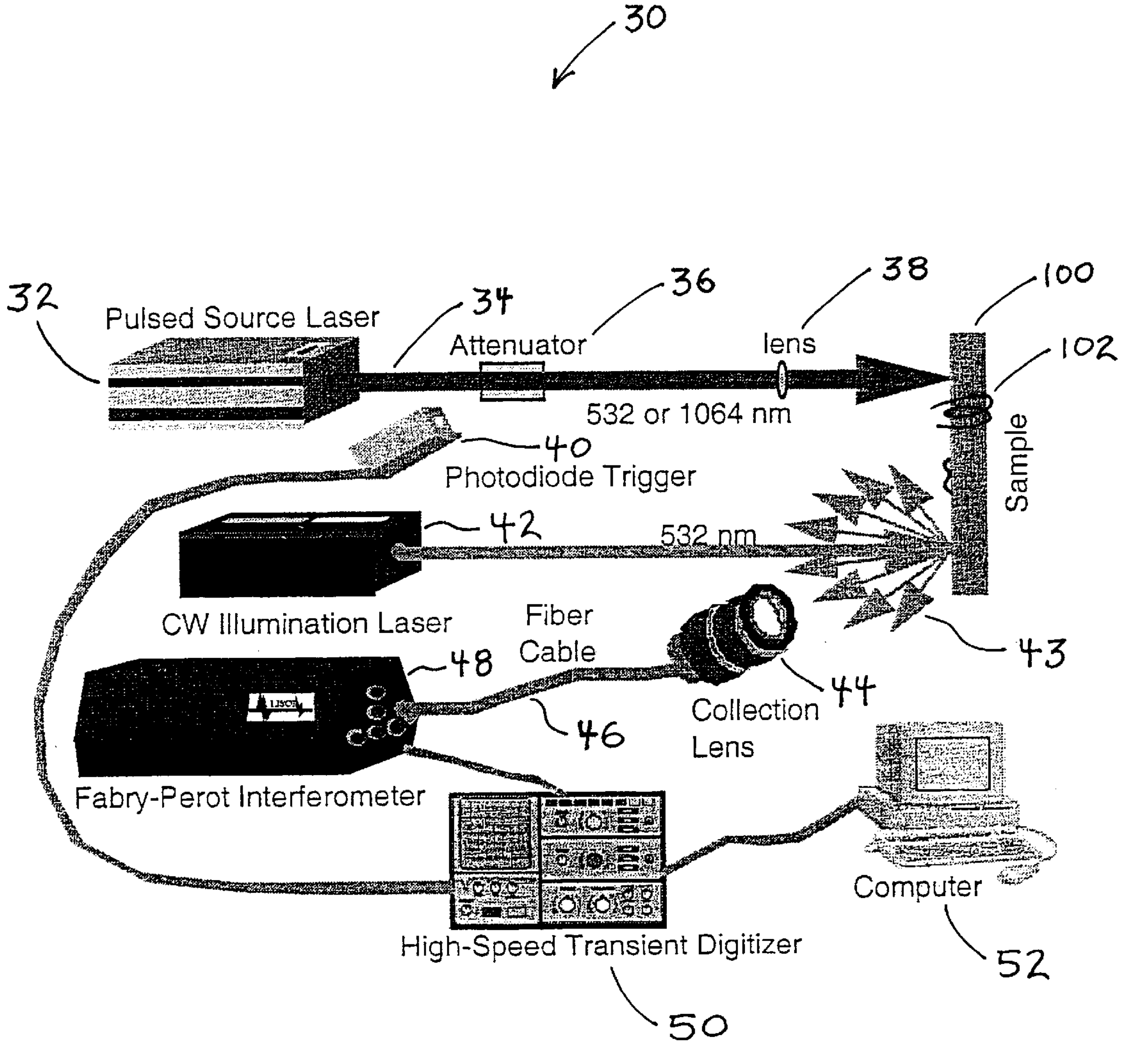
FIG. 7 illustrates another example of an acoustic sensor system, according to the present invention.

FIG. 7 illustrates another example of an acoustic sensor system, according to the present invention. This system is described in more detail in the following report, which is herein incorporated by reference, "Stress Evaluation and Model Validation Using Laser Ultrasonics", Wei-yang Lu, Jay J. Dike, Lawrence W. Peng, and James C. F. Wang, Sandia National Laboratories External Report, SAND99-8232, printed February, 1999.

In FIG. 7, acoustic sensor system 30 includes a pulsed laser source 32. Pulsed laser 32 generates ultrasonic waves by rapidly heating a point (or a line) on sample 100. The excitation laser 32 can be a pulsed, frequency-doubled, Q-switched Nd:YAG laser operating at 10 Hertz (Hz), with a pulsewidth of approximately 10 nanoseconds (ns) at 532 nanometers (nm) wavelength. Laser light 34 from laser 32 can pass through attenuator 36 and lens 38, to focus the laser beam on to a spot on sample 100. The detection system includes a CW illumination laser 42, which can be a continuous-wave (CW), frequency-doubled, diode pumped Nd:YAG laser emitting at 532 nm. The CW illumination laser 42 illuminates a point on sample 100. The reflected light 43 is collected via a camera lens 44, and then focused onto a fiberoptic cable 46, which is connected to the input of an UltraOptec LISOR Fabry-Perot interferometer 48. Surface displacement normal to the surface is detected by interferometer 48. Extraneous scattered light from other sources (primarily the excitation laser 32) can be minimized by using a spatial filter (not shown) placed in front of the camera lens and by using beam blocks placed at various locations (not shown). The signal from interferometer 48 is digitized at 1 GHz by a high-speed transient digitizer 50 (TEK RTD720), which is then stored and analyzed by computer 52. A trigger signal can be provided to digitizer 50 by photodiode trigger 40, which is triggered by light from pulsed laser source 32. Data from transient digitizer 50 is used by computer 52 to measure the time-of-flight (TOF) of a wave between two points on sample 100.

To eliminate potential problems with jitter from the trigger signal, either from synchronized output of the pulsed laser, or from the photodiode trigger 40, a two-point detection method can be used, where the detection beam from CW laser 42 is reflected twice from the sample and then fed to the interferometer 48. The interferometer output waveform is the sum of waveforms at two points, which behaves as if there are two receivers, although only one interferometer is used. Time-of-flight can then be accurately determined between the two measurement points, instead of relative to the excitation laser pulse 32. This two-point detection scheme, however, requires a mirror-like surface finish at the reflection points.

Figure 8:
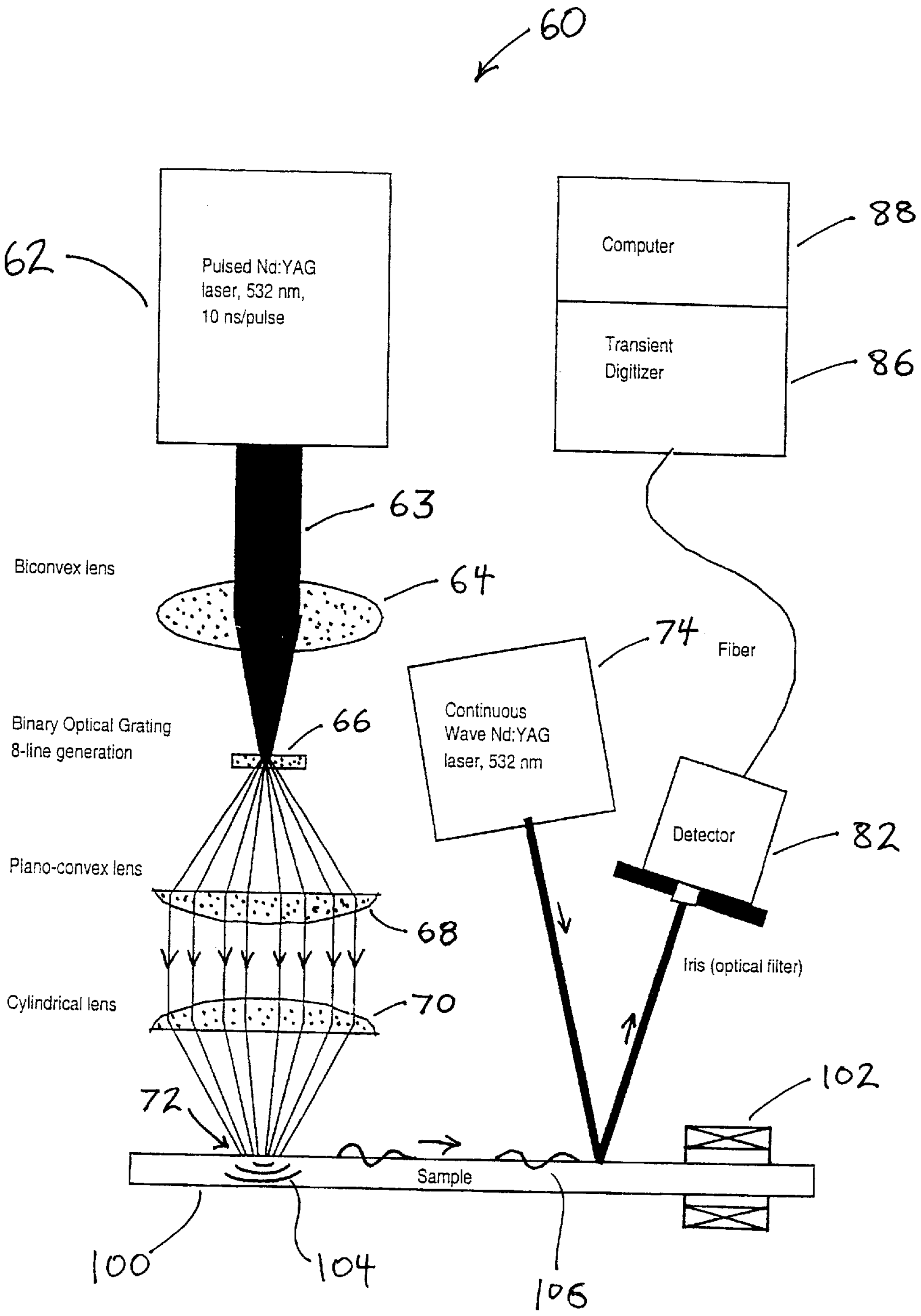
FIG. 8 illustrates another example of an acoustic sensor system, according to the, present invention.

FIG. 8 illustrates another example of an acoustic sensor system, according to the present invention. Since laser ultrasound that is generated with a single beam is generally broadband, there is very limited control of the frequency content of the signal. An alternative approach to using a single-beam is to use multi-beam illumination to enable the generation of narrow band ultrasound. Simulations have shown that multi-beam excitation give ultrasonic signals having well-defined Fourier Transforms. Well-defined Fourier Transforms are useful for measuring small shifts in the Fourier Transform signal.

FIG. 8 illustrates a schematic multi-beam illumination setup for acoustic sensor system 60. Multi-beam system 60 comprises a pulsed Nd:YAG excitation laser 62 (532 nm, 10 ns/pulse). Laser 62 generates a single laser beam 63, which passes through biconvex lens 64, and then impinges on binary optical grating 66. Grating 66 can be a grating with eight-line capability, manufactured by MEMS Optical, Inc. Grating 66 splits beam 63 into eight beamlets with fairly uniform intensity. The beamlets pass through a plano-convex lens 68, and then through a cylindrical lens 70 to focus the eight sub-beams onto eight spots 72 on the surface of sample 100. The excitation laser output beam 63 is approximately one-half inch in diameter and is focused (using a f/2 bi-convex lens 64) slightly behind the binary optical grating 66. This gave the best definition of multiple beamlets, and minimized laser damage to the grating 66. The multiple laser beams (e.g. beamlets) were collimated (using a two inch f/2 plano-convex lens 68) to a diameter of approximately one-half inch using the plano-convex lens 68, and then focused onto the sample using a cylindrical lens 70 (two inch f/3.5). The cylindrical lens 70 was mounted on a translation stage, and oriented so that focusing occurred in the horizontal direction. The balance of system 60, including CW laser 74, interferometer 82, digitizer 86, and computer 88, is the same as before with reference to FIG. 7. Likewise, sample 100 is at least partially surrounded by induction heating coil 102.

Figure 9:
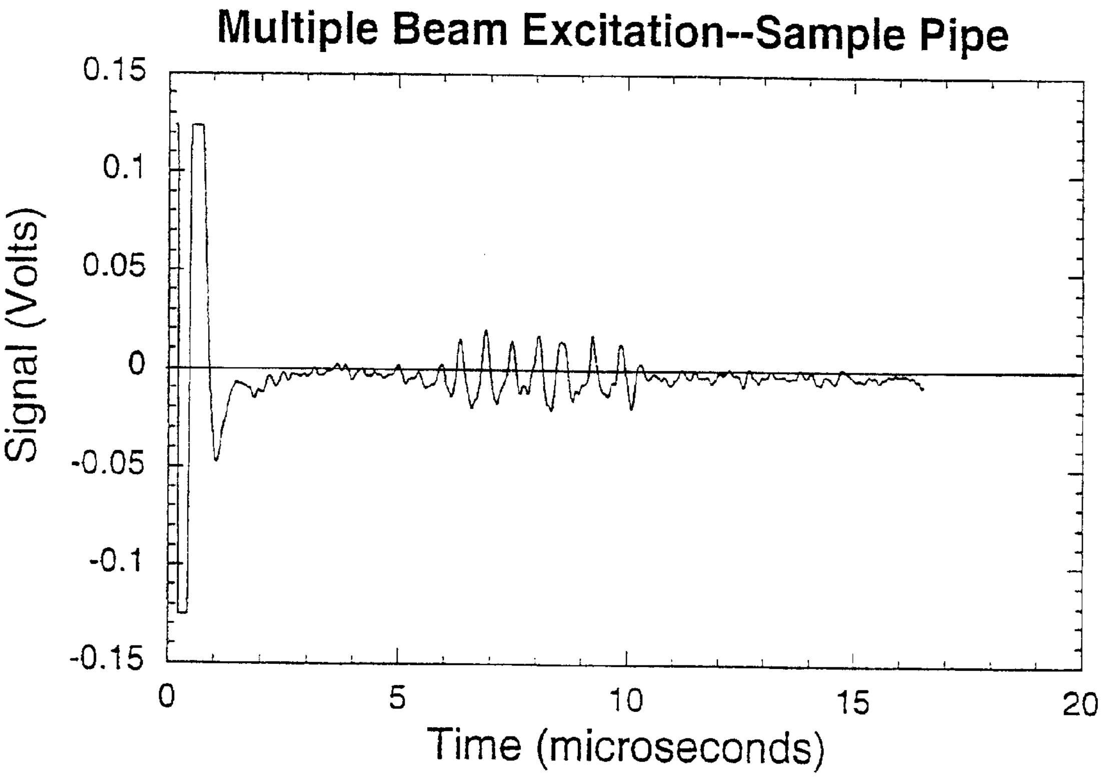
FIG. 9 illustrates an example of a typical ultrasonic signal detected by an acoustic sensor system using multiple illumination beams, according to the present invention.

FIG. 9 illustrates an example of a typical ultrasonic signal detected by acoustic sensor system 60, using multiple illumination beams as described in FIG. 8. A flat aluminum sample 100 with a polished surface was initially used in this experiment. Initially, the cylindrical lens 70 was places approximately 7.5 inches away from the sample, and then moved towards the sample. The optimum position of the cylindrical lens was determined by examining the Fourier Transform of the ultrasonic signal measured by the interferometer 82. Once established using the flat surface, the technique was applied to an aluminum pipe. Ultrasonic waves travelling around the circumference of the pipe were detected with system 60. The pipe surface was polished to give a linear specular reflection. The excitation and detection laser beams were aligned circumferentially. FIG. 9 illustrates the multi-beam signal at the optimum position. The group of well-defined oscillations in the signal, occurring from 6 to 10 microseconds, are clearly visible, and correspond well to the excitation of individual ultrasonic waves by each of the eight individual beamlet spots 72.

The particular sizes and equipment discussed above are cited merely to illustrate a particular embodiment of this invention. It is contemplated that the use of the invention may involve components or methods having different characteristics.

It is intended that the scope of the invention be defined by the claims appended hereto.

We claim:

1. A non-contact method of monitoring the process of induction heating a workpiece, comprising:

(a) providing an induction heating machine comprising an induction heating coil;

(b) providing a workpiece having an external surface;

(c) placing a localized region of said workpiece in close proximity to said induction heating coil;

(d) heating said localized region of said workpiece by applying power to said induction heating coil;

(e) generating an acoustic wave in the workpiece with a pulsed laser;

(f) optically measuring displacements of said external surface of the workpiece in response to said acoustic wave; and (g) calculating a sub-surface material property by analyzing said optically measured surface displacements, thereby monitoring said process of induction heating.

2. The method of claim 1, wherein step (f) further comprises using a laser interferometer to optically measure said displacements.

3. The method of claim 1, wherein said sub-surface material property is selected from the group consisting of temperature, stress, hardness, phase composition, carbon composition, depth of case hardening, initiation of phase transition from a ferritic phase to an austenitic phase in a workpiece made of ferromagnetic steel, and completion of phase transition from a ferritic phase to an austenitic phase in a ferromagnetic steel workpiece.

4. A non-contact method of detecting a characteristic time, as measured from the start of induction heating, when a change in a sub-surface material property has begun, during induction heating of a workpiece, comprising:

(a) providing an induction heating machine comprising an induction heating coil;

(b) providing a workpiece having an external surface;

(c) placing a localized region of said workpiece in close proximity to said induction heating coil;

(d) heating said localized region of said workpiece by applying power to said induction heating coil;

(e) generating an acoustic wave in said workpiece with a pulsed laser;

(f) optically measuring displacements of said external surface of said workpiece in response to said acoustic wave; and (g) calculating a sub-surface material property by analyzing said optically measured surface displacements;

(h) repeating steps (d) through (g) as often as needed to generate a time history of said sub-surface material property; and (i) calculating a characteristic time when a characteristic change in said sub-surface material property has begun, by analyzing said time history of said sub-surface material property.

5. The method of claim 4, wherein said sub-surface material property is selected from the group consisting of temperature, stress, hardness, phase composition, carbon composition, depth of case hardening, initiation of phase transition from a ferritic phase to an austenitic phase in a workpiece made of ferromagnetic steel, and completion of phase transition from a ferritic phase to an austenitic phase in a ferromagnetic steel workpiece.

6. The method of claim 4, further comprising:

(a) calculating the difference between said calculated characteristic time from step (i), and a desired characteristic time; and (b) adjusting when said induction heating machine is shut off in accordance with said difference in times.

7. A closed-loop method for controlling the operation of an induction heating machine, comprising:

(a) providing an induction heating machine comprising an induction heating coil;

(b) providing a workpiece having an external surface;

(c) placing a localized region of said workpiece in close proximity to said induction heating coil;

(d) heating said localized region of said workpiece by applying power to said induction heating coil;

(e) generating an acoustic wave in said workpiece with a pulsed laser;

(f) optically measuring displacements of said external surface of said workpiece in response to said acoustic wave;

(g) calculating a sub-surface material property by analyzing said optically measured surface displacements;

(h) creating an error signal by comparing an attribute of said calculated sub-surface material property with a desired attribute;

(i) reducing said error signal below an acceptable limit by adjusting, in real-time, the workpiece's position relative to said induction heating coil; and (j) repeating steps (d) through (i), as often as necessary, during induction heating.

8. The method of claim 1, wherein generating an acoustic wave in step (e) comprises:

(a) splitting said pulsed laser into a plurality of beamlets;

(b) collimating said beamlets; and (c) focussing said beamlets onto a plurality of spots on said workpiece; whereby a plurality of acoustic waves are generated simultaneously from said plurality of spots.

9. The method of claim 8, wherein said plurality of beamlets comprises at least six beamlets.

10. A closed-loop method for controlling the operation of an induction heating machine, comprising:

(a) providing an induction heating machine comprising an induction heating coil;

(b) providing a workpiece having an external surface;

(c) placing a localized region of said workpiece in close proximity to said induction heating coil;

(d) operating said induction heating machine, wherein operating comprises applying a specified amount of power to said induction heating coil, thereby heating said localized region of said workpiece;

(e) generating an acoustic wave in said workpiece with a pulsed laser;

(f) optically measuring displacements of said external surface of said workpiece in response to said acoustic wave;

(g) calculating a sub-surface material property by analyzing said optically measured surface displacements;

(h) creating an error signal by comparing an attribute of said calculated sub-surface material property with a desired attribute;

(i) reducing said error signal below an acceptable limit by adjusting, in real-time, said operation of said induction heating machine; and (j) repeating steps (d) through (i) as often as necessary during induction heating.

11. The method of claim 10, wherein adjusting said operation of said induction heating machine in step (i) comprises adjusting when said induction heating machine is shut off.

12. The method of claim 10, wherein adjusting said operation of said induction heating machine in step (i) comprises adjusting said specified amount of power being applied to said induction heating coil.

13. A non-contact system for monitoring the induction heating of a workpiece by an induction heating machine, comprising:

an induction heating machine comprising an induction heating coil;

a workpiece having an external surface and a localized region located in close proximity to said induction heating coil;

means for operating said induction heating machine, wherein operating comprises applying a specified amount of power to said induction heating coil, thereby heating said localized region of said workpiece;

means for generating an acoustic wave in said workpiece with a pulsed laser;

means for optically measuring displacements of said surface of said workpiece in response to said acoustic wave; and means for calculating a sub-surface material property by analyzing said optically measured surface displacements.

14. The system of claim 13, further comprising:

means for creating an error signal by comparing an attribute of said calculated sub-surface material property with a desired attribute;

means for reducing said error signal below an acceptable limit by adjusting, in real-time, said operation of said induction heating machine; and means for repeatedly reducing said error signal as often as necessary during induction heating.

15. The system of claim 14, wherein said means for reducing said error signal comprises means for adjusting said workpiece's position relative to said induction heating coil.

16. The system of claim 14, wherein said means for reducing said error signal comprises means for adjusting when said power to said induction heating coil is shut off.

17. The system of 14, wherein said means for reducing said error signal comprises means for adjusting said specified amount of power being applied to said induction heating coil.

18. The system of claim 14, wherein said means for generating an acoustic wave further comprises:

means for splitting said pulsed laser into a plurality of beamlets;

means for collimating said plurality of beamlets; and means for focussing said plurality of beamlets onto a plurality of spots on said workpiece; whereby a plurality of acoustic waves are generated simultaneously from said plurality of spots.

19. The system of claim 18, wherein said plurality of beamlets comprises at least six beamlets.

* * * * *